Aug. 20, 1957 A. C. KORTE ET AL 2,803,384
ELECTRIC FUEL PUMP
Filed May 24, 1954 2 Sheets-Sheet 1
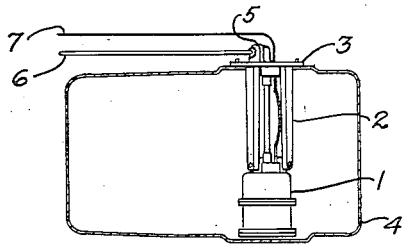
FIG. 1.
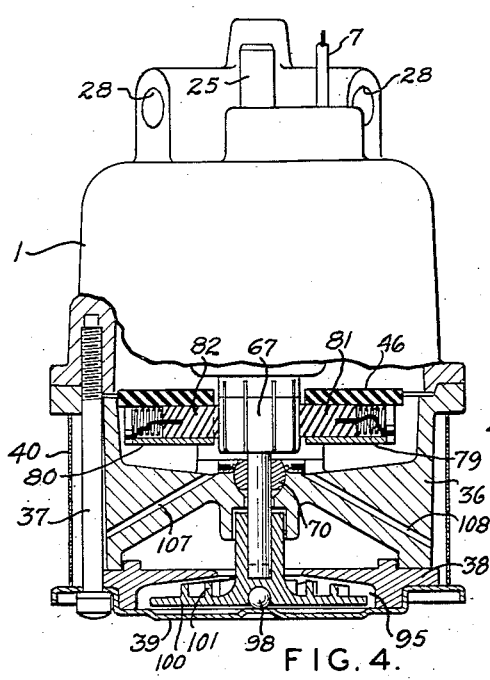
FIG. 4.
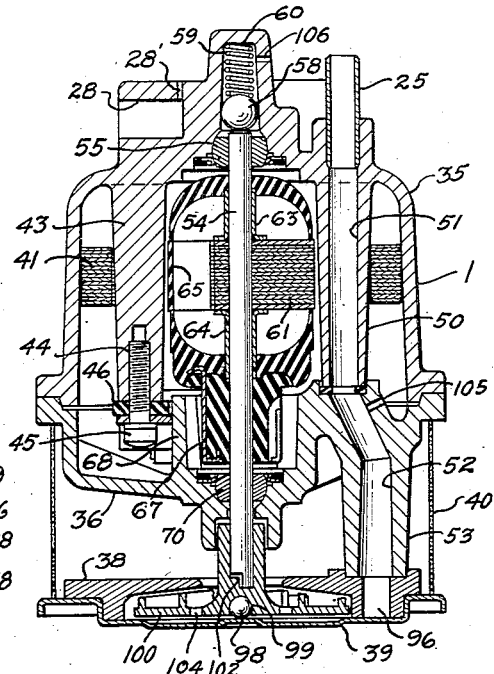
FIG. 5.
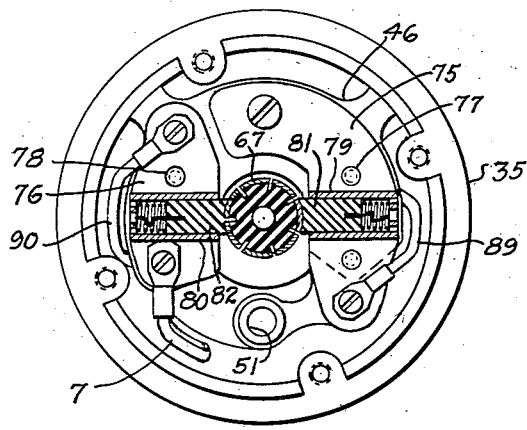
FIG. 6.
FIG. 7.
INVENTORS
ALFRED C. KORTE
ALEX N. SZWARGULSKI
CHARLES W. JEEP JR.
PAUL R. LARSON
BY George R. Ericson
ATTORNEY Aug. 20, 1957  A. C. KORTE ET AL  2,803,384
ELECTRIC FUEL PUMP Filed May 24, 1954  2 Sheets-Sheet 2

INVENTORS
ALFRED C. KORTE
ALEX N. SZWARGULSKI
CHARLES W. JEEP JR.
PAUL R. LARSON
BY
George R. Ericson
ATTORNEY United States Patent Office 2,803,384
Patented Aug. 20, 1957

2,803,384

ELECTRIC FUEL PUMP

Alfred C. Korte and Alex N. Szwargulski, St. Louis, Charles W. Jeep, Jr., Berkeley, and Paul R. Larson, Pine Lawn, Mo., assignors, by mesne assignments, to ACF Industries, Incorporated, New York, N. Y., a corporation of New Jersey Application May 24, 1954, Serial No. 431,743

12 Claims. (Cl. 222—333)

This invention relates to electric motor driven fuel pumps adapted for mounting submerged in a fuel tank and, more specifically, to an improved form of pump capable of smooth, quiet, and dependably uniform operation, regardless of the depth of fuel in the tank.

According to the present invention, the electric fuel pump is supported by a vibration-dampening mounting interposed between the pump and depending hanger members integral with a tank access hole cover so as to insulate the tank from vibration due to pump operation. This type of mounting can readily be independently designed to position the pump in tanks of varying depth so that no alteration is necessary in the pump structure because of the tank dimensions. The cover plate for the access hole in the fuel tank includes both fluid and electrical connections to and from the pump itself. The pump unit comprises a field coil housing attached to a pump body, and provision is made to properly lubricate the bearings of the motor by the pressure delivered from the pump. The bearings themselves are self-aligning, both radially and axially, with provision to yieldingly resist axial movements of the pump driven shaft. This provision includes both modification of the bearings and the fluid system, as well as modification of the pump impeller.

In order that the motor will not interfere with the function of the pump, the armature is suitably enclosed within a smooth housing so as to avoid the creation of turbulence in the fluid. Suitable baffles are formed within the motor casing which will shield the commutator and avoid any effect upon the brushes by the rapid circulation of the fuel surrounding the commutator.

Other novel features and advantages of this invention will become apparent as the description proceeds.

In the drawings:

Fig. 1 is an environmental view of the fuel pump mounted within a fuel tank.

Fig. 4 is a side elevational view of the pump with parts broken away to illustrate the details of construction.

Fig. 5 is a similar view of the pump to that shown in Fig. 4 taken at right angles.

Fig. 6 is a detail view of the motor commutator and brushes with the motor casing cover removed.

Fig. 7 is a detail view of the brush holder.

Figure 2:
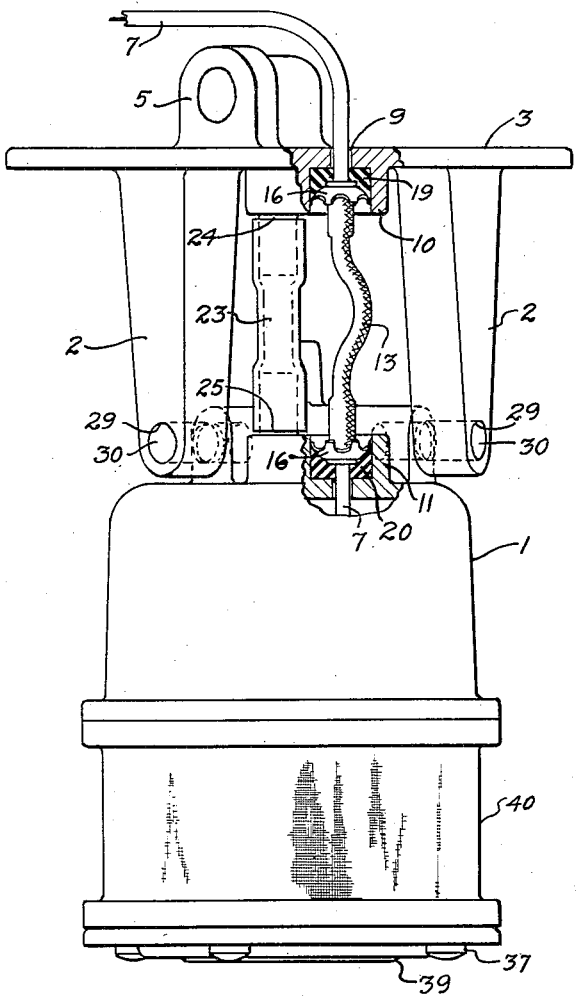
Fig. 2 is an enlarged view of the pump mounting.

In Fig. 1 the electric fuel pump 1 is shown supported by hangers 2 depending from an access hole cover 3 closing an opening in the upper wall of fuel tank 4. The cover may be secured in any suitable manner, and formed integrally therewith is a fitting 5 receiving the fuel line 6. The electric conductor 7 is supplied with power from any suitable source on the motor vehicle, and extends through an aperture 9 in the cover plate 3 as shown in Fig. 2. Formed integral with the underside of the access hole cover 3, concentric with the hole 9, is a socket 10. A similar socket 11 on the motor casing 1 faces the socket 10.

Figure 3:
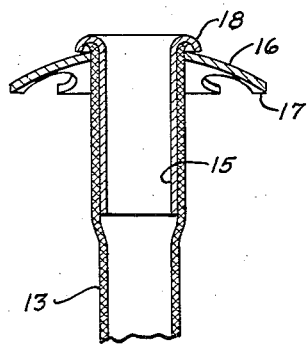
Fig. 3 is a view on enlarged scale of a detail shown in Fig. 2.
Figure 8:
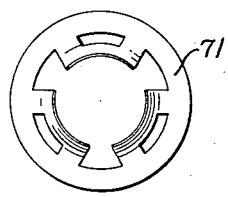
Fig. 8 is a top view of a bearing retainer.

In Fig. 3 is shown one end of the construction of the flexible current-conducting shield 13 for enclosing the power conductor 7. As shown in this figure, a metallic, braided shield 13 is soldered or otherwise suitably secured to a short tube 15 in each end of the shield 13. A spring steel ferrule 16 having sharp-edger fingers 17 is, in turn, secured to the shield 13 by the rolled edge 18 on the end of the tube 15. The ferrule 16 is preferably soldered to the shield 13 and the tube 15 to form a continuous electrical conductor between the ferrule 16, the rolled edge 18, and the metallic, braided cover of the shield 13.

Turning now to Fig. 2, in order to provide a liquid-tight seal around the conductor 7 where it passes through the access hole cover and the motor casing, the sockets 10 and 11 receive rubber grommets 19 and 20, respectively. The ferrules 16 on opposite ends of the shield 13 are then pressed into the sockets 10 and 11 to compress the rubber grommets 19 and 20 into sealing engagement with the conductor 7. Each ferrule is secured within the socket by the co-action of the spring fingers 17 within the sockets 10 and 11. Braided shield 13 protects the conductor 7 from abrasion while at the same time providing a suitable ground connection between the motor casing 1 and the access hole cover 3 through the metallic cover and the fingers 17.

Fuel line fitting 5 in the access hole cover 3 is connected with the fuel outlet from the motor casing 1 by a rubber hose 23 which has a slip fit with a nipple 24 pressed into a socket in the access hole cover 3, and a nipple 25 similarly fastened within a socket in the motor casing 1.

The motor casing 1 is provided in this case with a series of horizontal sockets 28 as shown in Figs. 4 and 5. In this case there are three so arranged as to align with similar sockets 29 in the hangers 2. Rubber plugs 30 are pressed through the openings 29 into the sockets 28 to form a vibration dampening support for the motor casing on the hanger arms. Vents 28' facilitate the escape of air in socket 28.

The motor casing 1 shown in Fig. 5 comprises a field coil housing 35 with a cover 36 enclosing its lower end and containing one of the end bearings for the pump motor. The pump body 38 enclosed by a cover 39 is positioned axially of the casing 1 on the cover 36 and the unit is secured in assembled relation by tie bolts 37, one of which is shown in Fig. 4. An inlet screen of cylindrical form 40 is positioned between the cover 36 and the plate 39. Within the field coil housing 35 is a laminated field core 41 provided with suitable field coils (not shown). The two parts are held in fixed relation by a press fit of the core 41 within the field coil housing 35. Formed integral with the field coil housing is an elongated boss 43, shown in Fig. 5. This boss is suitably threaded at 44 to receive screw 45, which firmly secures thereon an insulating block 46 for supporting the brushes. The field coil housing 35 is also formed with an elongated boss 50 bored to provide a fuel passage 51 connecting with the nipple 25 at one end, and, at the other, with a passage 52 formed in a boss 53 on the cover 36.

Figure 9:
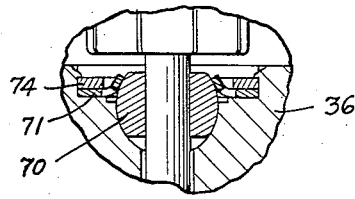
Fig. 9 is an enlarged view of a motor bearing.

The motor shaft 54 is mounted at its upper end in a spherical brass bearing 55 retained within a suitable socket in a manner specifically described hereinafter for securing the lower bearing 70, and shown in detail in Fig. 9. End thrust of the motor shaft is resisted by a ball bearing 58 held in endwise position against the shaft end by a spring 59 within the socket 60.

The armature for the motor has a laminated metal core 61 press fitted on the shaft 54. Tubular spacers 63 and 64 extend along the shaft to insulate the windings (not shown) from the armature shaft. At the same time, these spacers support, in part, a smooth plastic shell 65 enclosing the armature except for the pole portions of the armature core 61. Shell 65 is molded integrally at its lower end with the bars of the commutator 67. Cover 36 has baffles 68 located between the brushes to form a pocket, as shown in Fig. 5. Within this pocket in the cover 36 is a socket receiving spherical bearing 70 supporting one end of the motor shaft 54. This bearing is secured within the socket by an apertured steel spring washer 71 and a retainer washer 74 staked in position within the socket. Cover plate 36 also encloses a pair of brush supports 75 and 76. Each support is riveted at 77 and 78 to the insulating plate 46 previously described, and is formed with sockets 79 and 80 receiving the brushes 81 and 82. As shown in Fig. 7, each socket has a pair of spring fingers 83 which overlie the end of the sockets 79 and 80 to form a support for coil springs urging the brushes into engagement with the commutator 67. A pigtail 85 is secured in a socket in each of the brushes at one end, and at its other end is soldered within a channel 88 of the brush retainer 83. Each retainer is separately connected with the field winding by leads 89 and 90, respectively. Primary conductor 7 connects to insulated brush retainer 80, while retainer 79 connects with the motor casing through the screw 45.

Within the pump body 38 is a volute 95 connected with an outlet 96 communicating with the passages 51 and 52. The outlet 96 is sealed, and the volute enclosed, by a bottom plate 39 which, in turn, provides a support for ball bearing 98 mounted in a socket 99 of the impeller 100. The impeller is provided with suitable blading 101 at its upper side, and a driving connection 102 with the motor shaft 54. Since outlet pressure of the pump will be imposed beneath the impeller 100 and produce an end thrust upon the shaft 54, and on ball bearing 58, a plurality of pressure relief passages 104 are provided from the bottom surface extending to the blade roots. These passages will allow for some pressure relief and recirculation of the fuel discharged by the blading, and thus lessen the end thrust imposed upon the ball bearing 58.

The fluid discharged under pressure by the impeller 100 can pass through a bleed hole 105 into the field coil housing 35 to charge the same with fuel under pressure. This fuel will then find its way into the upper bearing 55, and thence out a bleed hole 106 from the upper bearing. It is not necessary to provide the same or like lubrication for the lower bearing 70 because this bearing is open top and bottom, but it is necessary to provide for drainage adjacent this bearing. For this purpose, one or more passages 107 and 108 may be provided to lead the fuel from the interior of the motor casing.

It will be understood that, regardless of the size or depth of the fuel tank 4, no modification of the electric pump is required. All that is necessary is that a proper set of hangers of suitable length be selected to mount the pump. This operation, in turn, involves insertion of the rubber plugs 30 between the hangers and the pump housing, and the connection of the fuel line 23 and conductor shield 13 before the pump is inserted in the tank. When mounted as shown in Fig. 1, the fuel line 6 is connected and the lead 7 is provided with a source of power, so that the unit is ready to operate. It is desirable, of course, that in any battery powered system the pump be put in operation immediately, even though the power required for cranking has reduced the battery potential to only a fraction of its usual rating. To achieve this, a special bearing arrangement is combined with a fluid pressure system for cooling and lubricating the pump so that power requirements for starting and running are reduced to a minimum.

The bearing system is characterized by the use of a ball bearing and spring 58 and 59 of sufficient tension to permit easy starting but at the same time eliminate all end play of the motor shaft 54. The fluid system for lubricating and cooling the pump is so designed that low spring tension is sufficient in the bearing 58 to overcome the forces developed by the fuel in the motor and in the pump. In the fluid system, fuel is pumped through the calibrated opening 105 under pressure. The outlet openings 106, 107 and 108 are likewise calibrated so as to maintain a slight pressure of fuel within the motor casing sufficient to lubricate the bearings but never excessive to the point of interfering with the free rotation of the armature 65 or with the location of the armature within the motor casing. Pressure is maintained independent of fuel level in the tank, so that, regardless of the depth of fuel in the tank, substantially the same pressures will always exist within the field coil motor casing and on the impeller. Since there is circulation provided by this system, there will be the desired degree of cooling, provided that the inlet passage 105 is sufficiently large, and this can be determined by suitable test.

Pressure of fuel acting below the impeller 100 could be neutralized by the recirculating openings 104, but in the present structure it is preferred that these openings be so calibrated as to relieve some but not all of the end thrust normally imposed by the pump impeller on the motor shaft. In this preferred form, the end thrust of the impeller is unidirectional and slightly less than that imposed by the spring pressure on the ball bearing 58, but it is insufficient to overcome the initial tension in spring 59 even during full speed operation. The holes are preferably so calibrated that fluid pressure beneath the impeller will be just sufficient to balance the weight of the motor armature and relieve substantially all of the pressure on the lower thrust bearing 98 at full operating speed.

The resulting structure is one in which end play is eliminated and constant clearance maintained, all of which contributes to better commutation of the electric motor. The commutator and brushes will occupy the same relation when the motor is stopped as when it is running, a distinctly novel feature in the pump art, which has heretofore used thrust bearings providing some clearance. The absence of end play due to mechanical clearances in the bearings minimizes the arcing, increases the mechanical and electrical life of the commutating mechanism, and maintains a constant working clearance for the pump impeller.

In this pump, the use of exposed copper has been avoided by the molded shell on the armature, and the commutator is constructed of non-corrosive metal.

It is contemplated that other modifications of the invention may occur to those skilled in the art which come within the scope of the appended claims.

We claim:

1. An electric motor driven tank mounted fuel pump including, in combination, a metallic tank cover having an apertured socket, a hanger fixed on and suspended from said cover, a combined pump and motor having a casing resiliently mounted on said hanger for limited movements relative thereto, an apertured socket in said casing, and concentric conductors for supplying power from a source external of said tank cover to said motor, comprising an insulated flexible conductor extending through said apertures to said motor, rubber grommets in said sockets surrounding said conductor, a second flexible conductor, and flexible, flanged ends on said second conductor for compressing said grommets in said sockets to form a liquid-tight joint and for engaging said socket to retain said flanged ends in position and form an electric connection between said motor and said tank cover.

2. An electric motor driven tank mounted fuel pump adapted for uniform operation in varying depths of fuel in the tank, comprising a casing for enclosing a field core of said electric motor, a rotatable armature having a shaft, radial bearings in said casing supporting said shaft, a pump casing secured to said motor casing, a centrifugal pump impeller in said casing driven by said shaft, a fixed thrust bearing for said shaft in said pump casing, a movable thrust bearing for said shaft in said motor casing, a pre-loaded spring acting on said movable thrust bearing to maintain said shaft against said fixed thrust bearing, and a combined pressure lubrication and cooling system for said motor supplied with fuel from said pump including means to balance the effect of fuel pressure in said pump and motor on said thrust bearings.

3. An electric motor driven tank mounted fuel pump adapted for uniform operation in varying depths of fuel in the tank, comprising a casing for enclosing a field core of said electric motor, a rotatable armature having a shaft, radial bearings in said casing supporting said shaft, a pump casing secured to said motor casing, a pump impeller in said casing driven by said shaft, a fixed thrust bearing for said shaft in said pump casing, a movable thrust bearing for said shaft in said motor casing, a pre-loaded spring acting on said movable thrust bearing, and a combined pressure lubrication and cooling system for said motor, including a supply connection between said pump casing and said motor casing and metered discharge ports located in said motor casing and thrust bearing.

4. An electric motor driven tank mounted fuel pump including, in combination, a motor casing for enclosing a field core of an electric motor, an insulating block secured to the upper end of said casing, a rotatable armature and a commutator having a shaft supported in said casing, sheet metal holders secured to said block, brushes in said holders in contact with said commutator, a pump casing on said motor casing, a pump impeller in said casing driven by said shaft, a pump discharge passage connecting said pump casing and said motor casing to maintain fluid pressure in said motor casing, and spaced baffles arranged concentric with said commutator and between said brushes for preventing turbulence in the fluid from affecting the operation of said brushes on said commutator.

5. An electric motor powered, tank mounted fuel pump comprising, in combination, a metallic tank cover plate, a hanger having spaced, transversely and radially apertured arms fixed on and depending from said cover plate, a pump motor casing depending from the lower ends of said arms, and means for facilitating the assembly of said hanger with said motor casing and providing a resilient mounting for said motor casing on said hanger, comprising radial sockets in the upper end of said casing aligned with said apertures, rubber plugs adapted to be frictionally retained by forcible insertion through said apertures into said sockets to resiliently support said motor casing with respect to said hanger, and a flexible power supply for said electric motor including an electric conductor extending through said cover plate to said motor, an adjustable seal between said conductor and said plate in a recessed opening in said cover having a rubber grommet surrounding said conductor in said recess, a flexible metal shield coaxial with said conductor, and a spring metal ferrule on said shield retained in said recess by forcible insertion of said ferrule in said recess deforming said ferrule and compressing said grommet between said recess and said conductor to seal said cover.

6. An electric motor driven, tank mounted fuel pump adapted for uniform operation in varying depths of fuel in said tank, comprising a motor casing for enclosing a field core, a rotatable armature having a shaft, radial bearings in said casing supporting said shaft, a pump casing secured to said motor casing, a centrifugal pump impeller in said pump casing driven by said shaft, a fixed thrust-bearing for said shaft in said pump casing, metered openings between opposite sides of said impeller for reducing the thrust loads imposed on said shaft during operation of the pump, a movable thrust-bearing for said shaft in said motor casing, a pre-loaded spring acting on said movable thrust-bearing in a direction opposed to impeller thrust to prevent axial movement of said shaft, and a combined pressure lubrication and cooling system for said motor supplied with fuel from said pump including metered openings in said motor casing for limiting the pressure of fuel within said casing, means to communicate pressure in said motor casing to said movable thrust-bearing, and means for limiting the pressure acting on said movable thrust-bearing in opposition to said impeller thrust during operation of said pump.

7. In a fuel system for internal combustion engines, a fuel tank having an access opening, a metallic cover secured to said tank to close said opening, said cover having a hanger cast integral therewith extending downwardly through said opening, a combined motor-pump unit having a housing depending from the lower end of said hanger, and resilient means interconnecting the upper end of said housing and the lower end of the hanger for limited relative movements.

8. In a fuel system for internal combustion engines, a fuel tank having an access opening, a metallic cover secured to said tank to close said opening, said cover having a hanger cast integral therewith extending downwardly through said opening, a combined motor-pump unit having a housing depending from the lower end of said hanger, and resilient means interconnecting the upper end of said housing and the lower end of the hanger for limited relative universal movement.

9. In a fuel system for internal combustion engines, a fuel tank having an access opening, a metallic cover secured to said tank to close said opening, said cover having a fixed hanger extending downwardly through said opening, a combined motor-pump unit having a housing depending from the lower end of said hanger, and means interconnecting the upper end of said housing and the lower end of the hanger for limited relative universal movement, said means comprising a plurality of resilient members mounted on and circumferentially spaced about the vertical axis of said housing.

10. In a fuel system for internal combustion engines, a fuel tank having an access opening, a metallic cover secured to said tank to close said opening, said cover having a fixed hanger extending downwardly through said opening, a combined motor-pump unit having a housing depending from the lower end of said hanger, and means interconnecting the upper end of said housing and the lower end of the hanger for limited relative universal movement, said means comprising a plurality of resilient members circumferentially spaced about the vertical axis of said housing and engaged at their ends within sockets formed in said hanger and housing.

11. In a fuel system for internal combustion engines, a fuel tank having an access opening, a metallic cover secured to said tank to close said opening, said cover having a fixed hanger extending downwardly through said opening, a combined motor-pump unit having a housing depending from the lower end of said hanger, and means interconnecting the upper end of said housing and the lower end of the hanger for limited relative universal movement, said means comprising a plurality of resilient members circumferentially spaced about the vertical axis of said housing, said housing having coplanar radially extending sockets to seat their respective resilient members, said members projecting from their sockets for engagement within sockets formed in the hanger, whereby said members are stressed in shear.

12. An electric motor driven tank mounted fuel pump adapted for uniform operation in varying depths of fuel in the tank, comprising a casing for enclosing a field core of said electric motor, a rotatable armature having a shaft, radial bearings in said casing supporting said shaft, a pump casing secured to said motor casing, a centrifugal pump impeller in said casing driven by said shaft, a fixed thrust bearing for said shaft in said pump casing, a thrust bearing engaging said shaft and mounted for movement axially of said motor casing, and a pre-loaded spring acting on said movable thrust bearing to maintain said shaft against said fixed thrust bearing.

(References on following page)

References Cited in the file of this patent

UNITED STATES PATENTS

| | | |
|---|---|---|
| 2,139,370 | Lauer et al. | Dec. 6, 1938 |
| 2,246,738 | Lauck | June 24, 1941 |
| 2,369,282 | Curtis et al. | Feb. 13, 1945 |
| 2,370,590 | Taylor | Feb. 27, 1945 |
| 2,413,546 | Curtis et al. | Dec. 31, 1946 |
| 2,573,850 | Korte | Nov. 6, 1951 |